United States Patent [19]

Friedland

[11] Patent Number: 5,243,397
[45] Date of Patent: Sep. 7, 1993

[54] DISTANCE MEASURING SYSTEM
[75] Inventor: Igor V. Friedland, Azor, Israel
[73] Assignee: Elop-Electrooptics Industries Ltd., Haifa, Israel
[21] Appl. No.: 981,659
[22] Filed: Nov. 25, 1992
[51] Int. Cl.$^5$ .......................... G01C 3/00; G01C 5/00; G01S 1/44; G01S 3/02
[52] U.S. Cl. .......................... 356/1; 342/398; 342/450; 342/458
[58] Field of Search .................. 342/398, 450, 458; 356/1

[56] References Cited

U.S. PATENT DOCUMENTS

| | | | |
|---|---|---|---|
| 2,830,487 | 4/1958 | Griffith | 356/1 |
| 3,400,398 | 9/1968 | Lapeyre et al. | |
| 3,620,626 | 11/1971 | Daly | 356/4 |
| 3,687,556 | 8/1972 | Price et al. | 356/1 |
| 3,714,657 | 1/1973 | Lapeyre | |
| 4,268,167 | 5/1981 | Alderman | 356/1 |
| 4,752,799 | 6/1988 | Stauffer | 356/1 |
| 4,911,548 | 3/1990 | Gill | 356/1 |

Primary Examiner—Stephen C. Buczinski
Attorney, Agent, or Firm—Mark M. Friedman

[57] ABSTRACT

A system for measuring distances between a central location and any number of remote locations. A transmitter at the central location radiates one or two rotating beams which rotate at an angular velocity which need not be determined. Specially placed sensors at a remote location sense the passage of the beam or beams and allow the accurate determination of the distance between the transmitter and the sensors without the need to measure and/or communicate the angular velocity of rotation of the transmitter signals.

16 Claims, 3 Drawing Sheets

DISTANCE MEASURING SYSTEM

FIELD AND BACKGROUND OF THE INVENTION

The present invention relates to systems for measuring distances and, more particularly, to a system wherein the distance between a transmitter and receivers at any remote location is accurately measured.

It is important in a number of application to be able to quickly and accurately determine the precise distance from a fixed base position to one or more remote locations within the line of sight of the fixed base position. One example of such an application is the surveying of land preparatory to the construction of buildings or roads where it is crucial to accurately determine distances and elevations from one or more base points to various points around the site.

A number of such systems have in the past been proposed. Typically in such systems a transmitter located at a central location transmits a single rotating beam (U.S. Pat. No. 4,268,178) or a pair of rotating beams (U.S. Pat. Nos. 3,714,657, 4,268,167, 4,911,548). Receivers at a remote location are used to sense the beam or beams which is require to allow the distance between the transmitter and receivers to be determined. What the known systems have in common is that in order to determine the distance it is necessary to have an accurate determination of the angular velocity of the transmitted beam or beams.

Typically, the angular velocity of the beam is known at the central location and is transmitted, for example by radio channel or by any other suitable means (see, for example, U.S. Pat. No. 3,714,657) to the remote location where the value of the angular velocity is used to calculate the distance between the central and remote locations.

Such systems are expensive, since they require angle to code converters, modulators, receivers, demodulator and other elements to convey the value of the angular velocity to the remote location.

In several known systems an average angular velocity of rotating laser beams is measured at the remote location rather than at the transmitter (see U.S. Pat. No. 4,268,167). This obviates the need to transmit the value from the transmitter to the remote location. However, it then becomes necessary to frequently measure the average angular velocity, for example, once per transmitter revolution. A fundamental difficulty with such a system is that the angular velocity often varies instantaneously and such variations are not picked up by the average angular velocity measurements. The result is that the accuracy of distance measurement in such systems is less than satisfactory.

There is thus a widely recognized need for, and it would be highly advantageous to have, a distance measuring system which accurately measures distances between a central location and a remote location and which is independent of the angular velocity of the beam or beams being transmitted by a transmitter at the central location.

SUMMARY OF THE INVENTION

According to the present invention there is provided a distance measuring system for determining the distance between a central location and a remote location, comprising: (a) a transmitter located at the central location, the transmitter transmitting a sweeping beam; (b) a sensor means located at the remote location for detecting the beam, the sensor means including a pair of near detectors disposed so that an imaginary line connecting the near detectors is substantially perpendicular to the beam, and a pair of far detectors, located farther from the central location than the near detectors, the far detectors being disposed so that an imaginary line connecting the far detectors is substantially perpendicular to the beam; and (c) electronics means for calculating the distance between the central location and the remote location based on the differential time of detection of the beam by the pair of near detectors, the differential time of detection of the beam by the pair of far detectors, the distance between the near detectors, the distance between the far detectors, and the beam path distance between the near detectors and the far detectors.

According to an alternative embodiment according to the present invention there is provided a distance measuring system for determining the distance between a central location and a remote location, comprising: (a) a transmitter located at the central location, the transmitter transmitting a sweeping beam; (b) a sensor means located at the remote location for detecting the beam, the sensor means including a pair of near beam guides disposed so that an imaginary line connecting the near beam guides is substantially perpendicular to the beam, and a pair of far beam guides, located farther from the central location than the near detectors, the far beam guides being disposed so that an imaginary line connecting the far beam guides is substantially perpendicular to the beam, the near beam guides and the far beam guides conveying the beam to a beam detector; and (c) electronics means for calculating the distance between the central location and the remote location based on the differential time of detection of the beam which travelled through the pair of near beam guides, the differential time of detection of the beam which traveled through the pair of far beam guides, the distance between the near beam guides, the distance between the far beam guides, and the beam path distance between the near beam guides and the far beam guides.

According to another alternative embodiment according to the present invention there is provided a distance measuring system for determining the distance between a central location and a remote location, comprising: (a) a transmitter located at the central location, the transmitter transmitting a pair of sweeping beams; (b) a sensor means located at the remote location for detecting the beam, the sensor means including a near detector, and a far detector located farther from the central location than the near detector; and (c) electronics means for calculating the distance between the central location and the remote location based on the differential time of detection of each of the beams by each of the detectors, and the beam path distance between the near detector and the far detector.

According to yet another alternative embodiment according to the present invention there is provided a distance measuring system for determining the distance between a central location and a remote location, comprising: (a) a transmitter located at the central location, the transmitter transmitting a pair of sweeping beams; (b) a sensor means located at the remote location for detecting the beams, the sensor means including a near beam guide, and a far beam guide, located farther from the central location than the near beam guide, the near beam guide and the far beam guide conveying the beams to a beam detector; and (c) electronics means for calculating the distance between the central location and the remote location based on the differential time of detection of each of the beams which travelled through each of the beam guides, and the beam path distance between the near beam guide and the far beam guide.

According to further features in preferred embodiments of the invention described below, the beams are coherent light beams, such as laser beams.

According to still further features in the described preferred embodiments the beam guides are fiber optic devices or beam reflectors.

The present invention successfully addresses the shortcomings of the presently known configurations by providing a system for accurately measuring distances using a sweeping transmitted beam which is independent of the angular velocity of the beam.

The present invention discloses a novel distance measuring device which is based on the detection at a remote location of one or more sweeping beams transmitted by a transmitter at a central location. The detection is carried out in such a way that the accurate measurement of the distance can be effected without the need to measure the angular velocity of the beam or beams.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a distance measuring system which can be used to accurately determine the distance between a central location and a remote location independent of the angular velocity of a sweeping beam or sweeping beams transmitted by a transmitter located at the central location.

The principles and operation of a distance measuring system according to the present invention may be better understood with reference to the drawings and the accompanying description.

Figure 1:
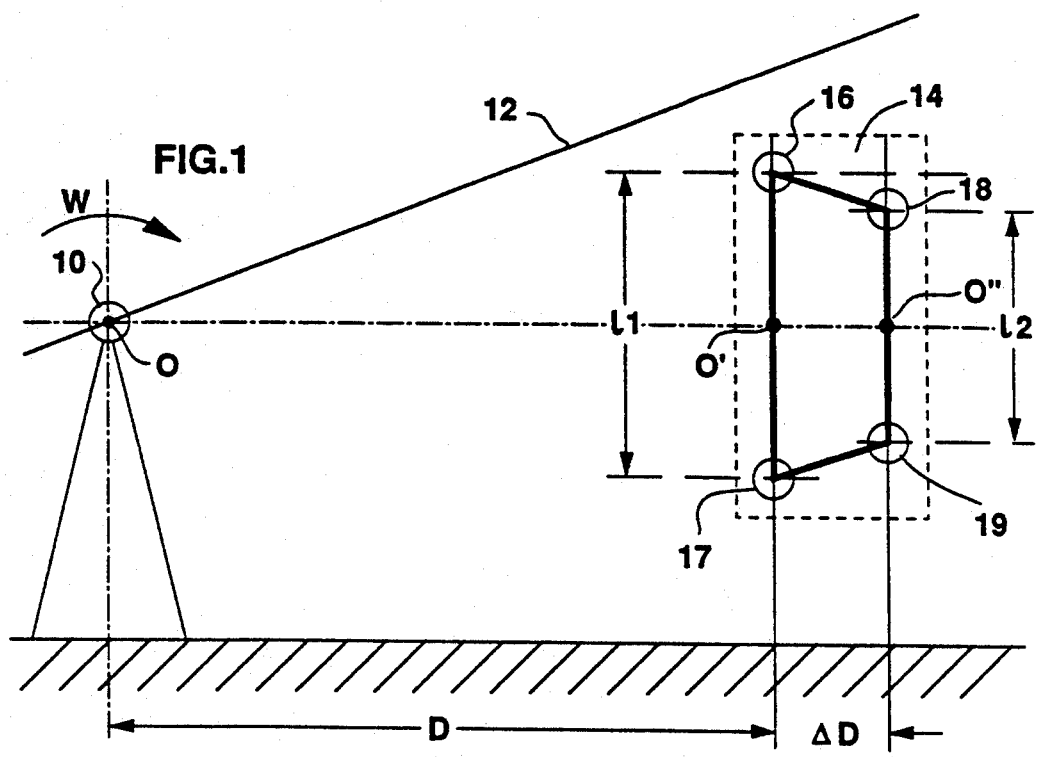
FIG. 1 is a schematic depiction of a system according to the present invention featuring a single beam.

Referring now to the drawing, FIG. 1 illustrates a basic embodiment featuring a single transmitted beam. The system includes a transmitter 10 located at a central location which serves as the point from which subsequent distance measurements are made. Transmitter 10 emits a beam of radiation 12. Preferably, beam 12 is a coherent light source, such as a laser of suitable type and intensity. Beam 12 is caused, through any suitable means, to sweep across the surrounding area, preferably through rotation at a suitable angular velocity. As will become more apparent from the discussion below, the precise value of the angular velocity is irrelevant to the system of the present invention, nor is it important that the angular velocity be kept very constant.

A system according to the present invention further includes a sensor means 14, or receiver, which is located at a remote location whose distance from transmitter 10 it is desired to determine. Sensor means 14, is made up of a number of components. Specifically, sensor means 14 includes a pair of near detectors, 16 and 17, disposed so that an imaginary line connecting near detectors, 16 and 17, of length $l_1$, is substantially perpendicular to beam 12, and a pair of far detectors, 18 and 19, located farther from transmitter 10 and being disposed so that an imaginary line connecting far detectors, 18 and 19, of length $l_2$, is substantially perpendicular to beam 12. Each of detectors 16, 17, 18, and 19 detects the times of impingement of beam 12 upon it. Transmitter 10 and sensor means 14 may have any spatial orientation relative to each other, so long as beam 12 is perpendicular to the imaginary lines connecting each pair of detectors.

A variety of methods may be used to ensure that the imaginary lines between near detectors, 16 and 17, and the imaginary line between far detectors, 18 and 19, are perpendicular to beam 12. This can be accomplished, for example, through use of a standard inclinometer. Alternatively, the imaginary lines in question may form any other angle with beam 12 as long as that angle is known and is properly incorporated in the calculation of the distance. A system according to the present invention further includes electronics means (FIG. 2) for calculating the distance, D, between transmitter 10 (marked 0) and the front surface of sensor means 14 (marked 0') based on the differential time of detection of beam 12 by near detectors, 16 and 17, the differential time of detection of beam 12 by far detectors, 18 and 19, the distance, $l_1$, between near detectors, 16 and 17, the distance, $l_2$, between far detectors, 18 and 19, and the beam path distance, $\Delta D$, between near detectors, 16 and 17, and far detectors, 18 and 19.

The distance, D, can be easily calculated as follows, assuming that D is much greater than $l_1$:

$$D = l_1/(w_1 * t_1) \qquad (1)$$

where $t_1$ is the beam flying time from sensor 16 to sensor 17, $w_1$ is the angular velocity of the beam 12 when it passes sensors 16 and 17.

In a similar way, we have, assuming D is much greater than $l_2$:

$$D + \Delta D = l_2/(w_2 * t_2) \qquad (2)$$

where $\Delta D$ and $l_2$ are defined in FIG. 1, $t_2$ is the beam flying time from sensor 18 to sensor 19, $w_2$ is the angular velocity of beam 12 as it passes sensors 18 and 19.

The time difference $t_2 - t_1 = \Delta t$ is sufficiently small so as the angular velocity of beam 12 is virtually identical for either pair of detectors. This is because over such a short time period, transmitter 10, or whatever means are used to sweep beam 12, is virtually unable to change its velocity to any extent. For this reason, it is accurate to assume that:

$$w_1 = w_2 \qquad (3)$$

Figure 2:
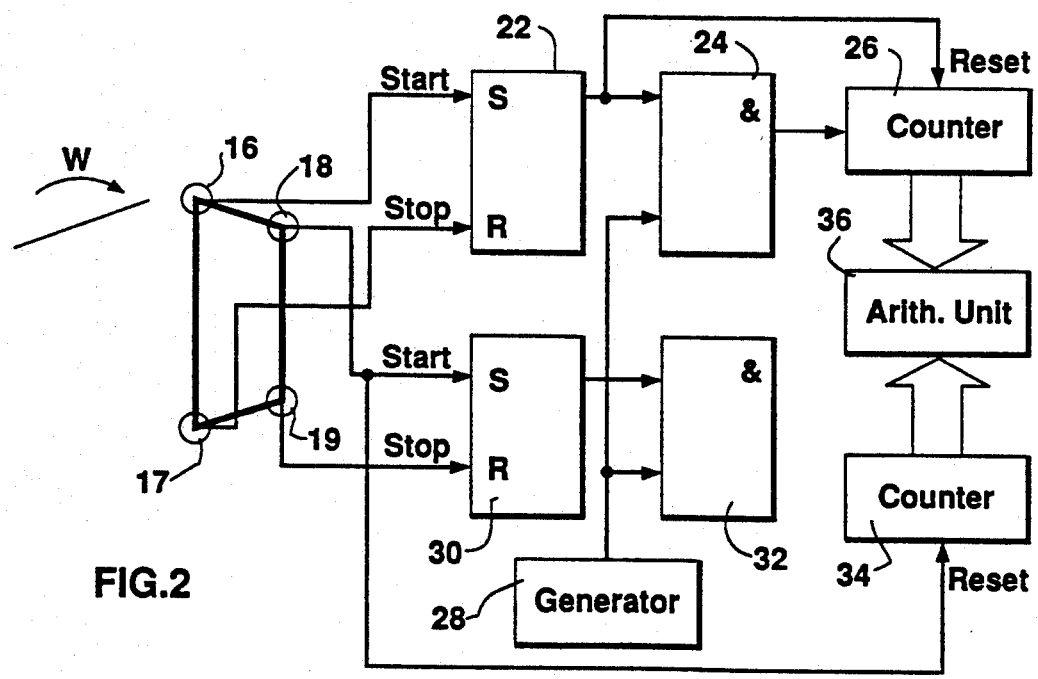
FIG. 2 is a depiction of the system of FIG. 1 but also including a representation of a possible electronic circuit for determining the distance.

Dividing Equation (2) by Equation (1) and taking advantage of Equation (3), one gets:

$$D = \Delta D / (\{l_2 * t_1 / l_1 * t_2\} - 1) \quad (4)$$

where $\Delta D$, $l_1$ and $l_2$ are known and fixed geometrical parameters of the sensor means 14, $t_1$ and $t_2$ are measured by an electronic means, such as that shown in FIG. 2. It is to be noted that the distance D, as calculated from Equation (4) is completely independent of the angular velocity of the beam 12.

The time interval $t_1$ required for beam 12 to traverse the distance $l_1$, between sensors 16 and 17 is measured by a trigger 22, an AND gate 24 and a counter 26, which counts the clock pulses from a generator 28 as beam 12 travels from sensor 16 to sensor 17.

The time interval $t_2$ can be defined in a similar way, using a trigger 30, an AND gate 32 and a counter 34. An arithmetic unit 36, which would typically be a microprocessor performs the mathematical calculations as described in Equation (4) to determine the distance D.

A variation of the basic embodiment described above is shown in FIG. 5. Here the distance measurement described above and shown in FIGS. 1 and 2 is effected with the use of a single photosensor 70. Such an approach makes it possible to achieve more accurate results since time interval measuring errors resulting from differences between amplifiers are avoided. Also, such an arrangement results in a lower cost device since only a single amplification circuitry is required for processing the sensor signals.

Figure 5:
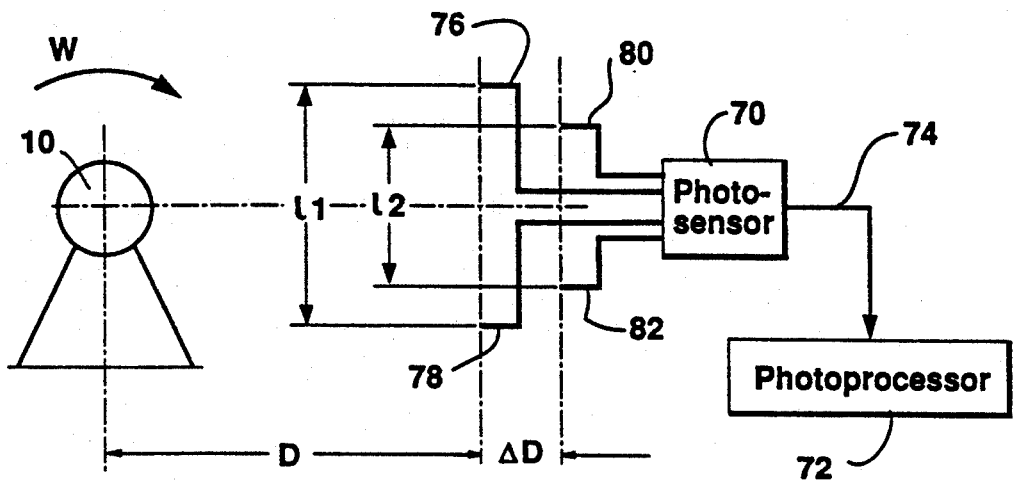
FIG. 5 is a depiction of a system such as that of FIGS. 1 and 2 but using a single sensor and fiber optics.

The arrangement shown in FIG. 5 includes the use of beam guides, such as fiber optics bundles. Such fiber optics bundles, 76, 78, 80, and 82, are positioned in place of detectors, 16, 17, 18, and 19 (FIGS. 1 and 2), respectively, and are used to guide beam 12 to a single detector or photosensor 70. Single photosensor 70 is connected, through a line 74 to a microprocessor 72.

In operation, each time beam 12 passes through, four pulses are transferred through line 74 to microprocessor 72 which serves to calculate the appropriate time intervals and to determine the distance D according to Equation (4).

Figure 6:
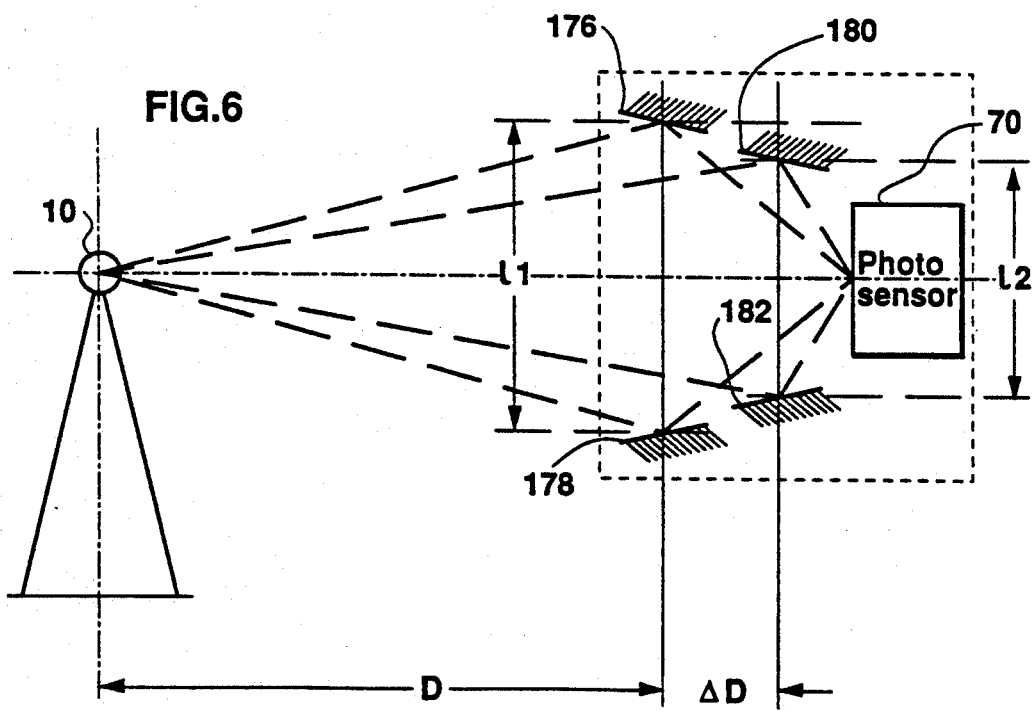
FIG. 6 is a depiction of a systems such as that of FIG. 5 but using a set of reflectors, rather than fiber optics, to guide the beams to the detectors.

A second variation of the basic embodiment described above is shown in FIG. 6. This variation varies from the one described immediately above and shown in FIG. 5 in that instead of using fiber optics bundles, an arrangement of system of reflectors, or optical mirrors, is utilized (FIG. 6). Mirrors, 176, 178, 180, and 182, are arranged in such a way that the reflecting beams are incident on the surface of single detector 70.

Figure 3:
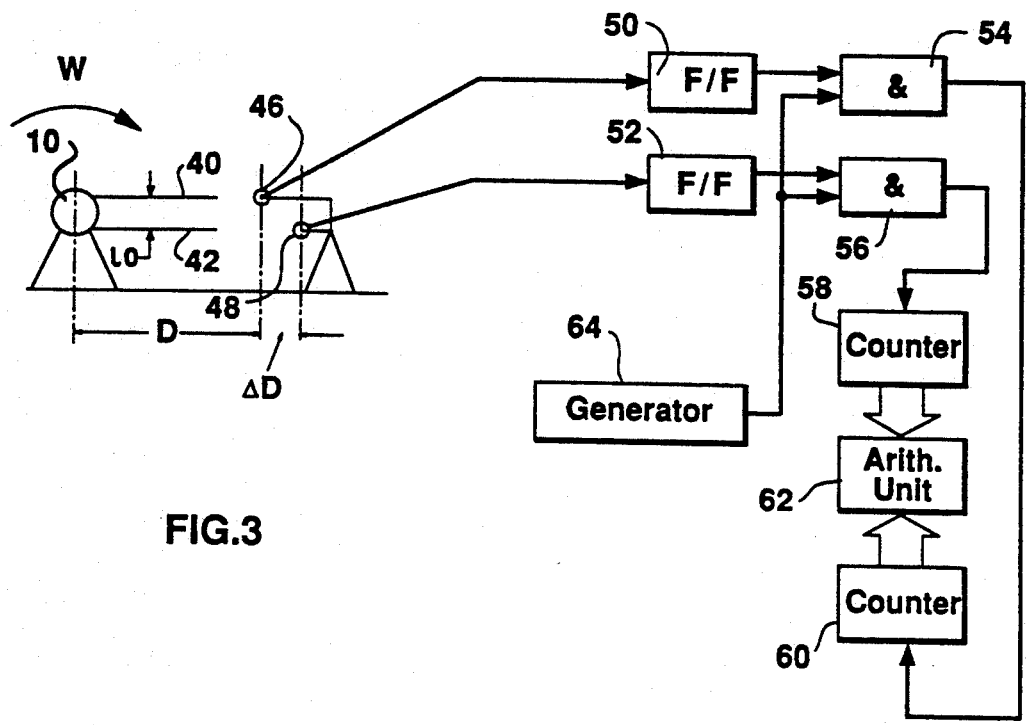
FIG. 3 is a schematic depiction of a system according to the present invention featuring a pair of beams.

A second basic embodiment according to the present invention is depicted in FIG. 3. Here, a pair of parallel beams 40, 42 are emitted by transmitter 10. This is contrast with the first basic embodiment where only a single beam 12 (FIGS. 1, 2, 5 and 6) is used. The sensor means at the remote location includes two photosensors 46 and 48, rather than two pair of detectors as in the first basic embodiment. The sensor means in this embodiment includes a near detector 46 and a far detector 48, as shown in FIG. 3. Each sensor creates separate signal in response to each beam, 40 and 42.

The distance D between transmitter 10 and near sensor 46 can be readily evaluated for the case of two parallel beams 40 and 42:

$$D = l_0 / (w_1 * t_0) \quad (5)$$

where $l_0$ is the distance between parallel beams 40 and 42, $w_1$ is the angular velocity of beams, 40 and 42, $t_0$ is the time required for beams, 40 and 42, to pass near sensor 46. Similarly:

$$D + \Delta D = l_0 / (w_2 * t_0') \quad (6)$$

where $\Delta D$ is the distance between sensors 46 and 48, $w_2$ is the angular velocity of the beams, 40 and 42, while crossing far sensor 48, $t_0'$ is the time interval required for beams, 40 and 42, to cross far sensor 48.

Taking into consideration that, as discussed above, it is virtually true that $w_1 = w_2$, the distance D between transmitter 10 at the central location and sensor 46 at the remote location becomes:

$$D = \Delta D / (\{t_0 / t_0'\} - 1) \quad (7)$$

Again, it is to be noted that the calculation is completely independent of the angular velocity of the beams.

Also shown in FIG. 3 is one way of implement the electronic circuitry so as to determine D according to Equation (7). As shown in FIG. 3, flip-flops change the state in response to each appearance of signals of the sensors 46, 48. A flip flop 50 forms the pulses having a width which depends on time interval $t_0$. The width of a flip-flop 52 pulses depends on time interval $t_0'$. The distance D is calculated by Equation (7) while AND gates 54 and 56, counters, 58 and 60, arithmetic unit 62 and generator 64 are activated.

It should be noted that it is not essential that beams 40 and 42 shown in FIG. 3 be parallel to each other. The distance between central and remote locations can still accurately measured even using a pair of non-parallel beams and having a fixed angular orientation relative to each other. When non-parallel beams are used, a more complicated mathematical expression than Equation (7) is used to determine the distance.

Figure 4:
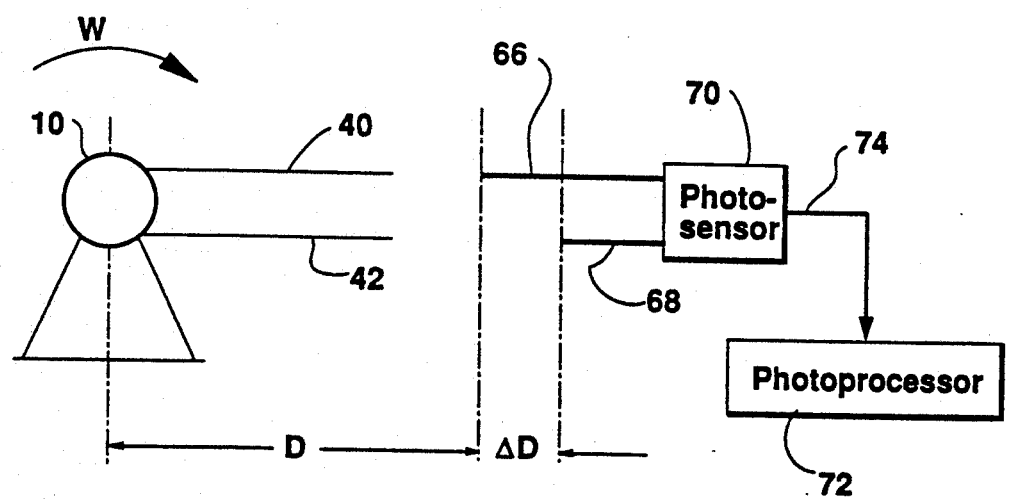
FIG. 4 is a depiction of a system such as that of FIG. 3 but using a single sensor and fiber optics.

FIG. 4 depicts a configuration similar to that of FIG. 3 but using fiber optics bundles, 66 and 68, and a single detector 70.

While the invention has been described with respect to a limited number of embodiments, it will be appreciated that many variations, modifications and other applications of the invention may be made.

What is claimed is:

1. A distance measuring system for determining the distance between a central location and a remote location, comprising:
   (a) a transmitter located at the central location, said transmitter transmitting a sweeping beam;
   (b) a sensor means located at the remote location for detecting said beam, said sensor means including a pair of near detectors disposed so that an imaginary line connecting said near detectors is substantially perpendicular to said beam, and a pair of far detectors, located farther from the central location than said near detectors, said far detectors being disposed so that an imaginary line connecting said far detectors is substantially perpendicular to said beam; and
   (c) electronics means for calculating the distance between the central location and the remote location based on the differential time of detection of said beam by said pair of near detectors, the differential time of detection of said beam by said pair of far detectors, the distance between said near detectors, the distance between said far detectors, and the beam path distance between said near detectors and said far detectors.

2. A system as in claim 1 wherein said beam is a coherent light beam.

3. A system as in claim 1 wherein said beam is a laser beam.

4. A distance measuring system for determining the distance between a central location and a remote location, comprising:
 (a) a transmitter located at the central location, said transmitter transmitting a sweeping beam;
 (b) a sensor means located at the remote location for detecting said beam, said sensor means including a pair of near beam guides disposed so that an imaginary line connecting said near beam guides is substantially perpendicular to said beam, and a pair of far beam guides, located farther from the central location than said near detectors, said far beam guides being disposed so that an imaginary line connecting said far beam guides is substantially perpendicular to said beam, said near beam guides and said far beam guides conveying said beam to a beam detector; and
 (c) electronics means for calculating the distance between the central location and the remote location based on the differential time of detection of said beam which travelled through said pair of near beam guides, the differential time of detection of said beam which traveled through said pair of far beam guides, the distance between said near beam guides, the distance between said far beam guides, and the beam path distance between said near beam guides and said far beam guides.

5. A system as in claim 4 wherein said beam is a coherent light beam.

6. A system as in claim 4 wherein said beam is a laser beam.

7. A system as in claim 4 wherein said beam guides are fiber optic devices.

8. A system as in claim 4 wherein said beam guides are beam reflectors.

9. A distance measuring system for determining the distance between a central location and a remote location, comprising:
 (a) a transmitter located at the central location, said transmitter transmitting a pair of sweeping beams;
 (b) a sensor means located at the remote location for detecting said beam, said sensor means including a near detector, and a far detector located farther from the central location than said near detector; and
 (c) electronics means for calculating the distance between the central location and the remote location based on the differential time of detection of each of said beams by each of said detectors, and the beam path distance between said near detector and said far detector.

10. A system as in claim 9 wherein said beams are coherent light beams.

11. A system as in claim 9 wherein said beams are laser beams.

12. A distance measuring system for determining the distance between a central location and a remote location, comprising:
 (a) a transmitter located at the central location, said transmitter transmitting a pair of sweeping beams;
 (b) a sensor means located at the remote location for detecting said beams, said sensor means including a near beam guide, and a far beam guide, located farther from the central location than said near beam guide, said near beam guide and said far beam guide conveying said beams to a beam detector; and
 (c) electronics means for calculating the distance between the central location and the remote location based on the differential time of detection of each of said beams which travelled through each of said beam guides, and the beam path distance between said near beam guide and said far beam guide.

13. A system as in claim 12 wherein said beams are coherent light beams.

14. A system as in claim 12 wherein said beams are laser beams.

15. A system as in claim 12 wherein said beam guides are fiber optic devices.

16. A system as in claim 12 wherein said beam guides are beam reflectors.

* * * * *